Patented Oct. 7, 1941

2,257,911

UNITED STATES PATENT OFFICE 2,257,911

SPONGE AND METHOD OF TREATING

Herman T. Kraft, Akron, Ohio, assignor to The General Tire & Rubber Company, Akron, Ohio, a corporation of Ohio No Drawing. Application January 23, 1939, Serial No. 252,398

8 Claims. (Cl. 91—68)

This invention relates to materials of a sponge-like or porous structure, and particularly to natural or artificial sponges of improved resiliency, aging and wear-resistant properties.

Natural sponges when wet with water become very soft and their strength is very materially reduced so that they become broken, torn, or abraded with very little use.

Artificial sponges, latex sponge rubber cushions, etc., while water-resistant, become oxidized under certain conditions, and it is desirable to provide a method for reinforcing these materials to prolong their life.

An object of this invention is to provide a method for improving the resiliency, water resistance and wearing properties of the natural or artificial sponges.

Another object of this invention is to provide sponges of improved properties.

A further object of this invention is to provide a means for restoring resiliency to aged and weakened, porous or spongy materials.

It has heretofore been proposed to treat rubber sponges with a solution of salts such as ammonium chloride containing an adhesive such as glue, gelatin, etc., to waterproof the material. It has also been proposed to apply weak organic solvent solutions of rubber to the surface of rubber sponges to serve as an adhesive for fireproofing materials such as ammonium chloride. These materials do not have any appreciable reinforcing value and may be removed by water.

It has now been found that either natural or artificial sponges may be treated throughout with an aqueous dispersion of rubber latex without filling the fine pores or interstices. It has further been found that the film of rubber which is formed on the surfaces of the pores greatly increases the resiliency, water-resistance and wearing properties of the porous material.

In the treatment of the spongy material according to my invention the article is first thoroughly soaked or wetted in an aqueous dispersion of rubber such as natural or concentrated rubber latex and then the article is squeezed or centrifuged to remove all the liquid with the exception of that which adheres to the walls of the pores. The sponge is then dried. The rubber latex used may be of the vulcanized type with or without suitable compounding ingredients, in which case the article only needs to be dried. If unvulcanized latex be used and it is desired to vulcanize it then suitable compounding ingredients such as sulphur, a protective colloid and an antioxidant may be added before applying the latex to the sponge and after drying, the material should be vulcanized.

The concentration of rubber in the treating solution should preferably be between 15 and 60%, the exact concentration depending upon the thickness of the film desired and on the type of spongy material to be treated. For treating the natural sponges and the sponges produced from latex froth, the dispersion should be more dilute and of a less viscous nature than that used for treating ordinary blown rubber sponges which have relatively large pores. To insure thorough wetting and penetration of the sponge material so that the fibres or surfaces forming the pores of the sponge structure are coated, it is preferable to add a wetting agent such as the sodium salt of a sulphonated higher alcohol, etc., to the latex mixture, and in the treatment of aged and weakened rubber articles a relatively large proportion, 2 or 3% of antioxidant, is preferred.

A natural latex (30% rubber) may be compounded to contain 100 parts by weight of latex, 4 parts of zinc oxide, .5 part of piperidine pentamethylene dithiocarbamate, .5 part of mercaptobenzothiazole, 2 parts of sulphur, .5 part of sodium myristol sulfonate, and .5 part of phenyl-beta-naphthylamine. A natural sponge may be wetted with this solution, squeezed between rolls to remove most of the added solution, dried, and then vulcanized for 30 minutes at 90° C.; whereupon, a sponge of increased resilience, substantially equally strong in a wet or dry condition and of much increased wear-resistance, will be produced.

A natural sponge with very high absorbing qualities may be immersed in water preferably made slightly alkaline with ammonia. The excess water is removed by passing it through squeeze rolls, and the wet sponge may then be soaked in a suitably compounded aqueous rubber dispersion containing 30% rubber solids, squeezed to remove the excess liquid, dried, and vulcanized, thereby giving to the sponge improved resilience and wear resistance.

An aged and weakened latex sponge article may be soaked in a suitably compounded vulcanized latex dispersion, sold under the trade name "Vultex", and diluted to about 20% rubber solids, squeezed free from surplus liquid and dried; whereupon, resiliency substantially equivalent to that of an unaged latex sponge rubber article will be restored to the aged product.

An ordinary blown rubber bath sponge may be thoroughly wetted with a suitably compounded latex mixture containing 50% rubber solids, squeezed to remove the excess liquid, dried and vulcanized. The product produced will have aging properties substantially equivalent to latex articles.

Rubber dissolved in organic solvent may be used in place of the aqueous dispersions above in treating natural sponges, but because of the deleterious effects of the solvent it is not suitable for treating rubber sponges. The article produced after treatment with organic solvent dispersions of rubber does not have the desirable aging properties of those treated with latex rubber and the viscosity of the solution is so great that difficulties are encountered in its use.

It will be seen that I have provided a method for rejuvenating sponge articles, as well as a method for improving the wear resistance of natural or artificial sponges.

It is to be understood that the particular form of product described, and the particular procedure set forth, are presented for purposes of explanation, and that various modifications of said product and procedure can be made without departing from my invention as defined in the appended claims.

What I claim is:

1. A porous sponge reinforced substantially throughout by rubber deposited on the fibres or surfaces forming the pores of the sponge structure.

2. A porous natural sponge having interior surfaces reinforced with rubber and characterized by increased resilience and substantially equivalent wet and dry structural strength.

3. A method for reinforcing natural and artificial sponges without rendering them impervious to water which comprises impregnating the sponge substantially through and with a dispersion of rubber, removing the excess liquid, and drying.

4. A method for reinforcing natural and artificial sponges without rendering them impervious to water which comprises immersing the sponge in an aqueous dispersion of suitably compounded rubber, removing the excess liquid, and drying and vulcanizing the product.

5. A method for reinforcing natural and artificial sponges without rendering them impervious to water which comprises immersing the sponge in an aqueous dispersion of suitably compounded rubber latex containing 15 to 60% rubber solids, squeezing the excess liquid from the product, and vulcanizing.

6. A method for reinforcing natural and artificial sponges without rendering them impervious to water which comprises immersing the sponge-like material in an aqueous dispersion of vulcanized latex containing 15 to 60% rubber solids, removing the excess liquid, and drying.

7. A relatively long wearing water absorbent sponge, comprising a natural sponge with the internal fibers or surfaces forming the pores coated with a rubber which has the characteristic of rubber deposited in situ from a rubber latex.

8. A method for reinforcing natural and artificial sponges, which comprises impregnating the sponge with a compounded rubber latex, removing any excess liquid, and drying.

HERMAN T. KRAFT.